(12) United States Patent
Ursenbach (10) Patent No.: US 10,626,884 B2
(45) Date of Patent: Apr. 21, 2020

(54) SYSTEMS AND METHODS FOR MAKING AIRFOILS

(71) Applicant: Hamilton Sundstrand Corporation, Charlotte, NC (US)

(72) Inventor: Daniel Ursenbach, Caledonia, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 627 days.

(21) Appl. No.: 15/374,741

(22) Filed: Dec. 9, 2016

(65) Prior Publication Data

US 2018/0163745 A1 Jun. 14, 2018

(51) Int. Cl.
| | |
|---|---|
| *F04D 29/38* | (2006.01) |
| *B29C 70/38* | (2006.01) |
| *B29C 70/48* | (2006.01) |
| *B29D 99/00* | (2010.01) |
| *B29C 70/54* | (2006.01) |
| *B29C 70/24* | (2006.01) |
| *B29C 70/34* | (2006.01) |
| *F02K 3/06* | (2006.01) |

(Continued)

(52) U.S. Cl.
CPC ............ *F04D 29/388* (2013.01); *B29C 70/24* (2013.01); *B29C 70/345* (2013.01); *B29C 70/38* (2013.01); *B29C 70/382* (2013.01); *B29C 70/48* (2013.01); *B29C 70/543* (2013.01); *B29D 99/0025* (2013.01); *F02K 3/06* (2013.01); *F04D 29/329* (2013.01); *F04D 29/545* (2013.01); *B29L 2031/08* (2013.01); *B29L 2031/082* (2013.01); *F05D 2220/36* (2013.01); *F05D 2230/20* (2013.01); *F05D 2300/6012* (2013.01); *F05D 2300/614* (2013.01)

(58) Field of Classification Search
CPC .... F04D 29/388; F04D 29/329; F04D 29/545; F02K 3/06; B29C 70/24; B29C 70/345; B29C 70/38; B29C 70/382; B29C 70/48; B29C 70/543; B29D 99/0025; B29L 2031/08; B29L 2031/082; F05D 2220/36; F05D 2230/20

See application file for complete search history.

(56) References Cited

U.S. PATENT DOCUMENTS

| | | | |
|---|---|---|---|
| 4,622,091 | A | 11/1986 | Letterman |
| 4,988,469 | A | 1/1991 | Reavely et al. |

(Continued)

OTHER PUBLICATIONS

European Patent Office, European Search Report dated May 4, 2018 in Application No. 17206444.6-1019.

*Primary Examiner* — Aaron R Eastman
(74) *Attorney, Agent, or Firm* — Snell & Wilmer L.L.P.

(57) ABSTRACT

A method of making a fan blade may include the steps of forming a core comprising fibrous material, and placing a first layer of dry fiber tows over the core using a robot. The first layer of dry fiber tows may be substantially un-crimped and may have a thermoplastic coating. A second layer of dry fiber tows may be placed over the first layer of dry fiber tows using the robot. The second layer may be un-crimped and coated similar to the first layer. The core, the first layer, and the second layer may be molded using resin transfer molding. The first layer may be placed over the core in a curved configuration. The core may include a three-dimensionally woven core formed on a loom and/or a plurality of layers of dry fiber tows placed by the robot.

20 Claims, 7 Drawing Sheets

(51) Int. Cl.
*F04D 29/32* (2006.01)
*F04D 29/54* (2006.01)
*B29L 31/08* (2006.01)

(56) References Cited

U.S. PATENT DOCUMENTS

| | | |
|---|---|---|
| 5,222,297 A | 6/1993 | Graff et al. |
| 5,279,892 A | 1/1994 | Baldwin et al. |
| 6,431,837 B1 | 8/2002 | Velicki |
| 7,837,446 B2 | 11/2010 | McMillan |
| 8,214,981 B2 | 7/2012 | Hethcock et al. |
| 9,162,750 B2 | 10/2015 | Coupe et al. |
| 9,259,858 B2 | 2/2016 | Gupta et al. |
| 2006/0275132 A1* | 12/2006 | McMillan ............. B29C 70/222 416/224 |
| 2008/0261474 A1* | 10/2008 | Goering ............... B29C 70/222 442/195 |
| 2012/0077398 A1* | 3/2012 | Gaillard ............... B29B 15/105 442/59 |
| 2013/0174969 A1 | 7/2013 | Karb et al. |
| 2014/0169972 A1* | 6/2014 | Suciu .................... F01D 5/225 416/189 |
| 2016/0001464 A1* | 1/2016 | Suzuki .................... B32B 5/26 264/544 |
| 2016/0032939 A1* | 2/2016 | Anderson ............... B29C 70/34 416/230 |
| 2016/0053060 A1* | 2/2016 | Moser ...................... C08J 5/24 428/172 |
| 2016/0185092 A1 | 6/2016 | Chamberlain et al. |

* cited by examiner

SYSTEMS AND METHODS FOR MAKING AIRFOILS

FIELD

The disclosure relates generally to airfoils made from placed dry fiber tows.

BACKGROUND

Fans in gas turbine engines are complex rotating systems that may encounter undesirable conditions during normal operation. Fans may be subject to debris entering an engine inlet. The debris may contact the blades of the fan and cause structural damage. As the use of composite materials for fan blades has become more prevalent, so too has the risk of delamination and fiber breakage.

Fan blades are typically designed to have a light weight while maintaining sufficient strength to absorb impacts. Many composite blades are made using a resin transfer molding (RTM) process. The typical RTM process for fan blades uses two-dimensionally woven plies, three-dimensional preforms, or both. These plies and preforms are costly to make and use complex weaving machines. The carbon fibers in the plies and preforms may not be optimally oriented as there is little ability to customize fiber orientation to accommodate loads on a blade.

SUMMARY

A method of making a fan blade is provided. The method includes the steps of forming a core comprising fibrous material, and placing a first layer of dry fiber tows over the core using a robot. The first layer of dry fiber tows may be substantially un-crimped and may have a thermoplastic coating. A second layer of dry fiber tows may be placed over the first layer of dry fiber tows using the robot. The second layer may be un-crimped and coated similar to the first layer. The core, the first layer, and the second layer may be molded using resin transfer molding.

In various embodiments, the core may be trimmed before the placing the first layer of dry fiber tows over the core. The first layer may be placed over the core in a curved configuration. The core may include a three-dimensionally woven core formed on a loom and/or a plurality of layers of dry fiber tows placed by the robot. The thermoplastic coating may be heated after placing the first layer over the core. The first layer and the second layer may be tufted and or needled together.

A fan blade is also provided. The fan blade may include a core comprising a fibrous material. A plurality of layers of dry fiber tows may be placed about the core to form a skin. The plurality of layers of dry fiber tows may have a thermoplastic coating and be substantially un-crimped. A resin material may be injected into at least one of the core or the plurality of layers of dry fiber tows.

In various embodiments, the fibrous material of the core may comprise a three-dimensionally woven material and/or a second plurality of layers of dry fiber tows. The plurality of layers of dry fiber tows maybe curved. A tufting may be disposed in the plurality of layers. The plurality of layers may also be needled together.

A fan for a gas turbine engine is also provided. The fan may include a hub, a fan blade coupled to the hub and configured to rotate about the hub, and a shroud disposed about the fan blade. The fan blade may include a core comprising fibrous material, and a first layer of dry fiber tows placed over the core. The first layer may be substantially un-crimped and has a thermoplastic coating.

In various embodiments, the first layer may be curved relative to a surface of the fan blade. The fan blade may further comprise a second layer of dry fiber tows placed over the first layer of dry fiber tows. The first layer and the second layer may be tufted together and/or needled together. The fan blade may also comprise a resin material injected into the core and/or the first layer.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or contact.

The present disclosure relates to composite fan blades made using Automated Fiber Placement (AFP) of dry fiber tows. AFP may use a robot to place the fiber in tows with a thermoplastic material. Heat may be applied to hold the tows in place by increasing tackiness of the thermoplastic. The preform may be made by adding numerous layers of the dry fiber tows. Reinforcement through the thickness can also be added via tufting or needling. Tufting and/or needling may insert additional fiber through the layers after layup. Various embodiments may also include a three-dimensional woven core in the middle of the preform with only the outer layers formed by AFP of dry fiber tows. The preform can be highly customized for optimal structure. The tows may be held in place in an un-crimped configuration. The robotic placement process allows consistency and repeatability in the manufacturing process. As used herein, dry means substantially free of viscous or adhesive material other than the thermoplastic coating.

Figure 1:
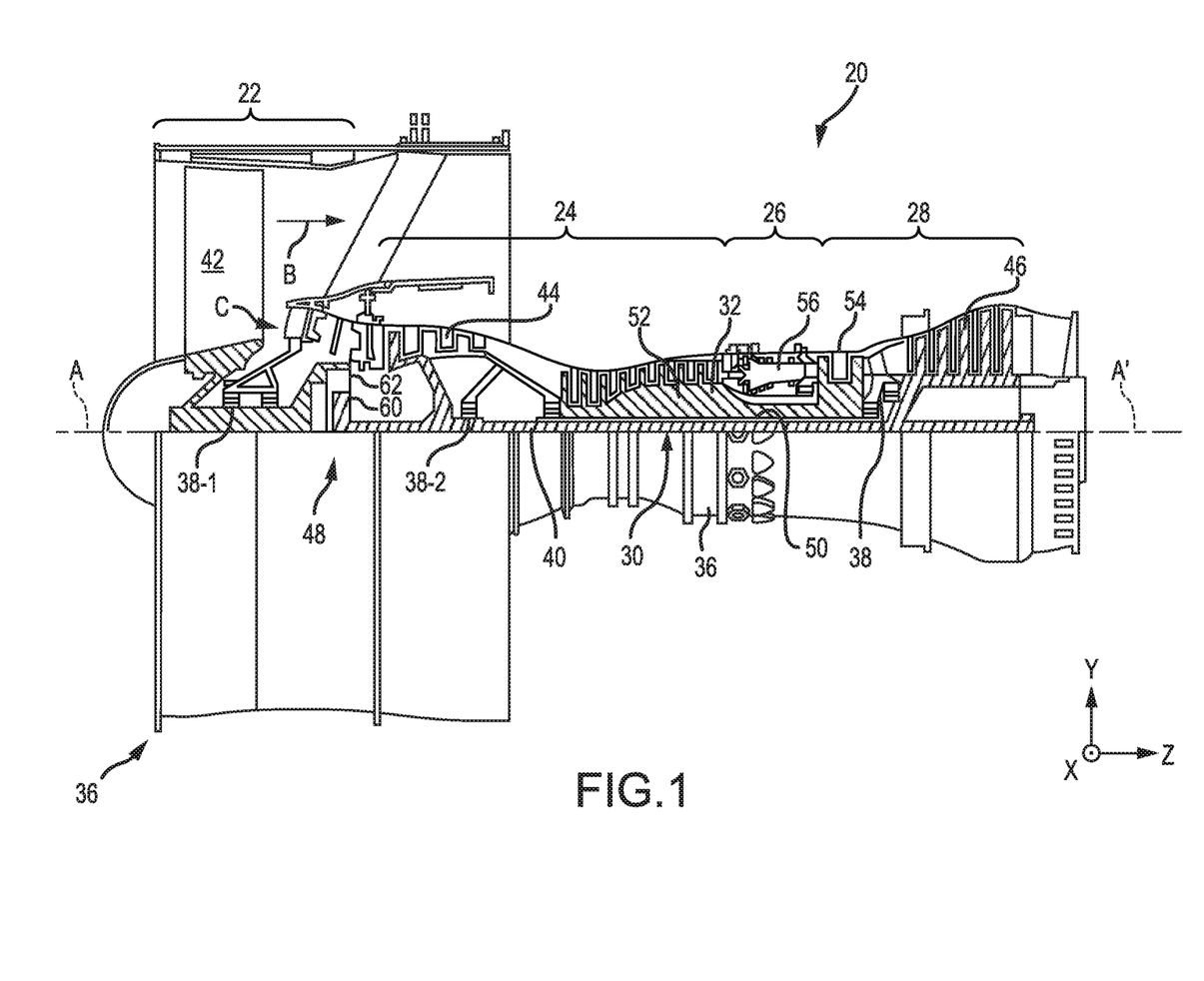
FIG. 1 illustrates an example of a gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 11, a compressor section 24, a combustor section 26 and a turbine section 28. Alternative engines may include, for example, an augmentor section among other systems or features. In operation, fan section 22 can drive fluid (e.g., air) along a bypass-flow path B while compressor section 24 can drive coolant along a core-flow path C for compression and communication into combustor section 26 then expansion through turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Fan 42 (or other rotating sections having airfoils such as compressor section 24 or turbine section 28) may include blades formed from composite materials. Geared architecture 48 may comprise a gear assembly enclosed within a gear housing that couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'.

A combustor 56 may be located between high-pressure compressor 52 and high-pressure turbine 54. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion.

Figure 2:
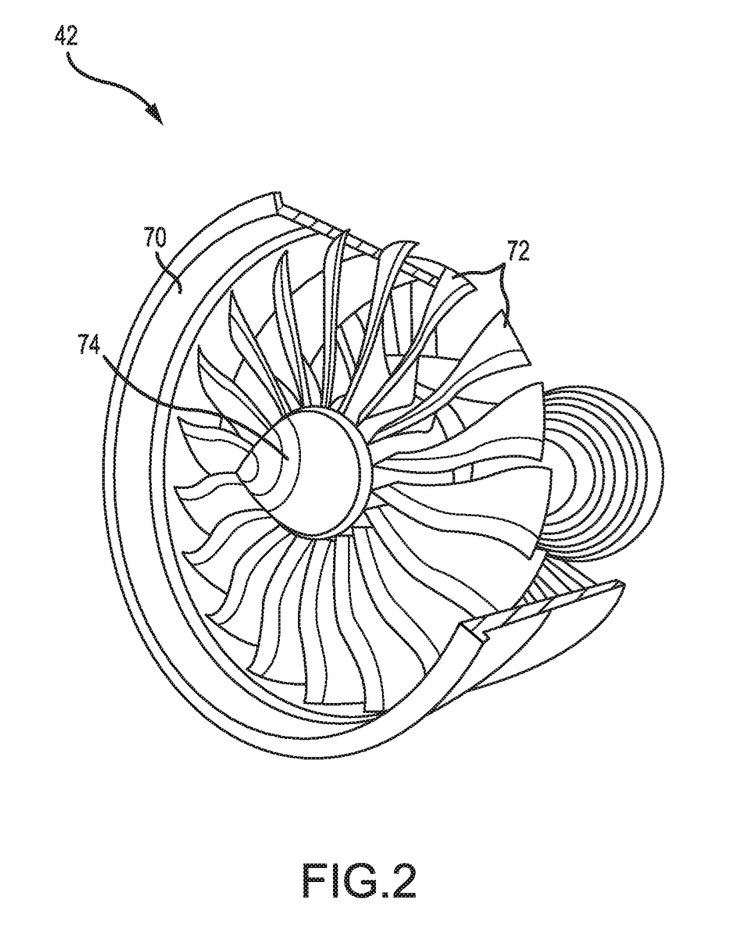
FIG. 2 illustrates a fan having a plurality of fan blades, in accordance with various embodiments.

Referring now to FIG. 2, a fan 42 is shown according to various embodiments. Fan 42 may include a shroud 70 having an annular geometry. Blades 72 may rotate about hub 74 within shroud 70. Impact events may occur when debris enters shroud 70 and contacts blades 72. Blades 72 made from AFP of dry fiber tows may be resistant to delamination in response to impact events while maintaining light weight. Blades 72 may be made either with or without a woven core. The core may be made of fibrous material such as AFP of dry fiber tows and/or woven fibers.

Figure 3A:
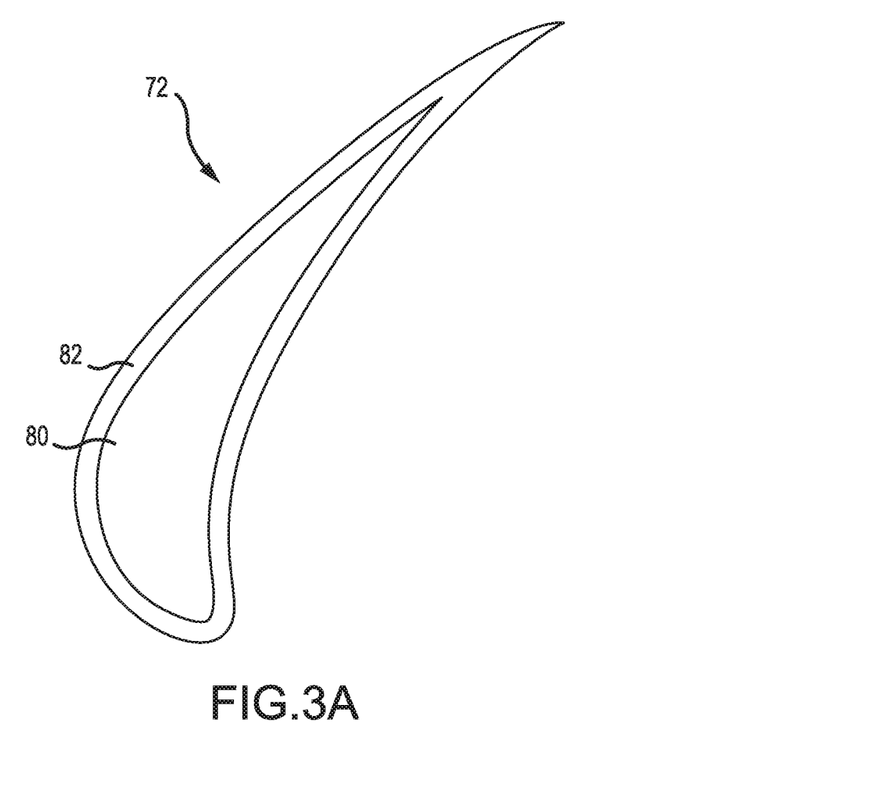
FIG. 3A illustrates a cross sectional view of a fan blade having a three-dimensional woven core and skin formed by automated fiber placement of dry fiber tows, in accordance with various embodiments.

Referring to FIG. 3A, an exemplary cross section of a blade 72 made using a core 80 and a skin 82 made using AFP of dry fiber tows is shown according to various embodiments. Core 80 may be a three-dimensionally woven core made using a loom to weave fibers into a predetermined shape. A three-dimensionally woven core may be a woven structure containing a set of fibrous yarn or tows lying in 3 orthogonal directions (e.g., an x-axis, y-axis, and z-axis). The woven structure may affect the physical properties in three planar directions as compared to two-dimensional woven composite form with yarns lying in only two orthogonal directions (e.g., an x-axis and a y-axis).

In various embodiments, core 80 may be trimmed to leave fibers in a predetermined shape. Skin 82 may be formed about core 80. Skin 82 may be made using AFP (as show in FIGS. 5 and 6) to place dry fiber tows directly on core 80, or fiber placed on a separate tool first, then attaching the dry fiber placed skin to the core. The dry fiber tows may include a plastic or thermoplastic coating to hold the fibers in place during the AFP process. A preform comprising core 80 and skin 82 may be molded using resin transfer molding (RTM). Generally, RTM includes a process where a molding material having a first material composition (e.g., a resin, a thermosetting material, a thermoplastic material, or the like) is heated and injected into a mold encasing at least a portion of the skin 82 and core 80. The molding material infiltrates and/or encases the skin 82 and core 80 and is subsequently cured. Core 80 and skin 82 may be injected with a resin material, such as the resin material commercially available under the tradename Hexcel RTM-6 for example, that lacks thermoplastic additives in response to the skin 82 and/or core 80 comprising dry fiber tows having a thermoplastic coating.

Figure 3B:
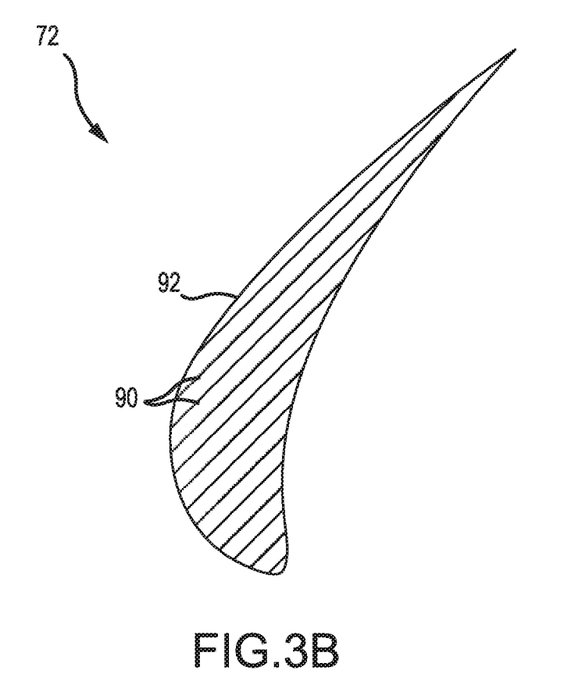
FIG. 3B illustrates a cross sectional view of a fan blade formed by automated fiber placement of dry fiber tows, in accordance with various embodiments.

Referring to FIG. 3B, an exemplary cross section of a blade 72 made using AFP of dry fiber tows 90 without a three-dimensionally woven core is shown according to various embodiments. Layers of dry fiber tows 90 are built up using an AFP process. Outer surface 92 may also be defined by dry fiber tows placed using AFP. The dry fiber tow 90 may be treated injected with a molding material using RTM, as described above with reference to FIG. 3A.

Figure 4:
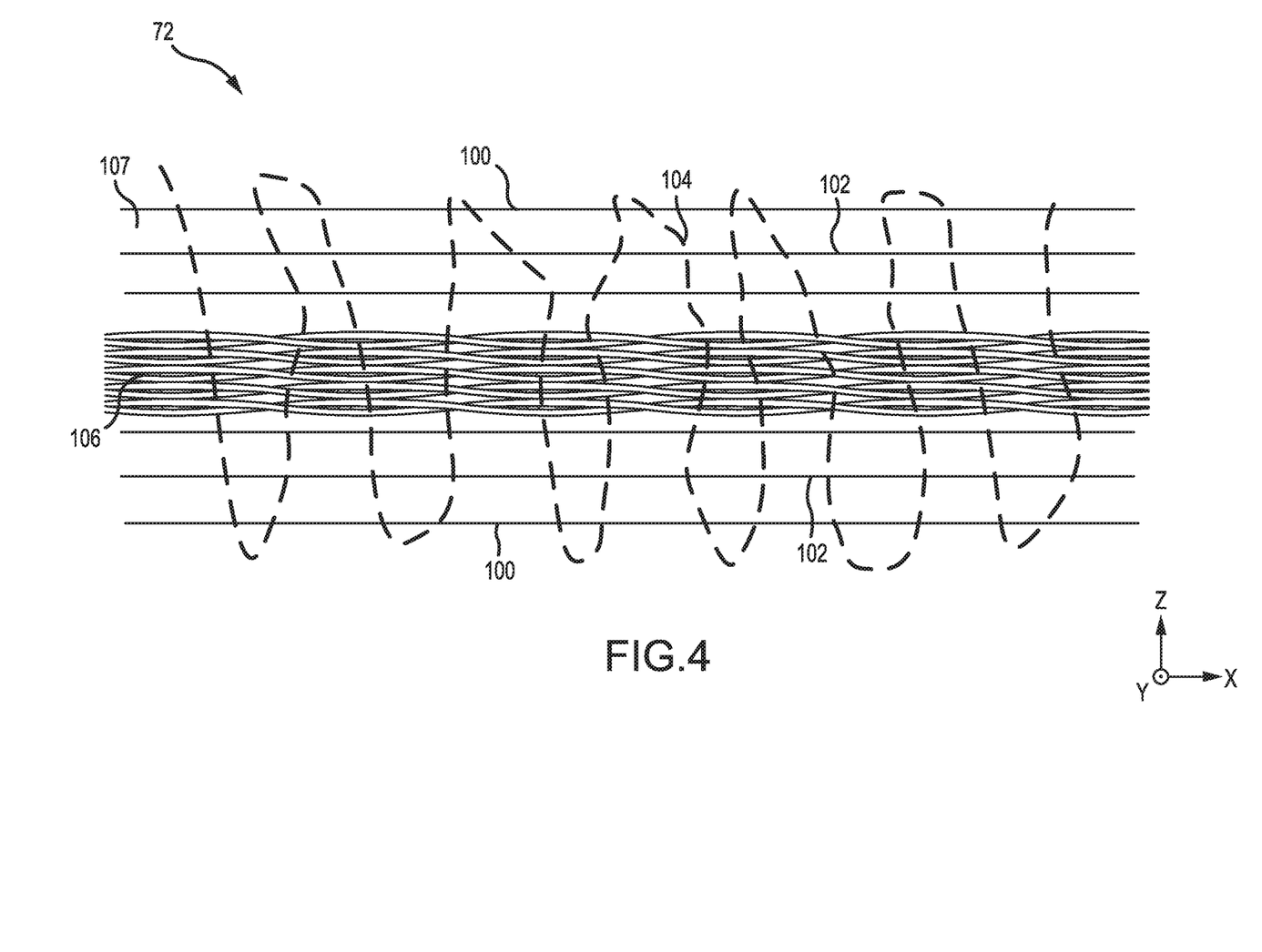
FIG. 4 illustrates a diagrammatic view of a blade having a three-dimensional woven core and skin formed by automated fiber placement of dry fiber tows, according to various embodiments.

Referring to FIG. 4, a diagram illustrating the placement of internal fiber tows 102 about core 106 is shown according to various embodiments. Internal fiber tows 102, which are similar to skin 82 of FIG. 3A and outer surface 92 of FIG. 3B, are placed in a predetermined orientation on core 106. Multiple layers of internal fiber tows 102 may be built by placement on core 106. Core 106 may include a three-dimensionally woven core. Core 106 may also comprise many layers of internal fiber tows 102 built by placement one on top of another. External fiber tows 100 may be placed as the outermost layer on either side of core 106. The skin (e.g., skin 82 of FIG. 3A) may include one or more layers of dry fiber tows placed using AFP. For example, the skin may include four layers of dry fiber tows placed on either side of core 106.

Figure 5:
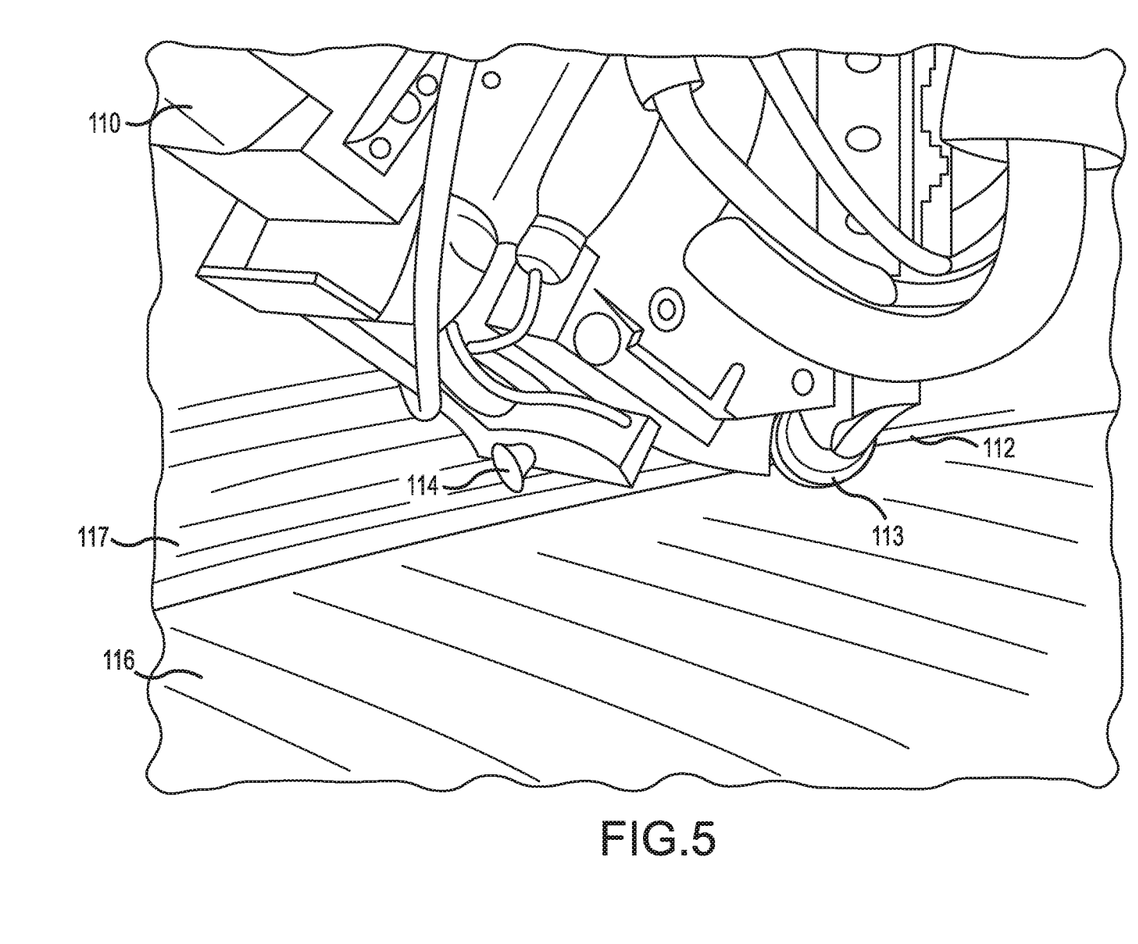
FIG. 5 illustrate automated fiber placement of dry fiber tows using a robotic tool, in accordance with various embodiments.

Referring briefly to FIG. 5, robot 110 may be programmed to deposit the tows at various predetermined angles and orientations. Robot 110 may include head 112 that places dry fiber tow 113 in position on lower layer 116 of fiber material. Upper layer 117 of fiber material may comprise a multiple dry fiber tows placed by head 112 on lower layer 116 as robot translates head 112. Heating device 114 may heat the dry fiber tow 113 to make a thermoplastic coating on dry fiber tow 113 more tacky and retain the layers of fiber material relative to one another.

Referring to FIG. 4, internal fiber tows 102 may be placed by a robot operating similar to robot 110 of FIG. 5. The robot may place the internal fiber tows 102 and/or external fiber tows 100 with the fiber tows oriented in various directions to augment the strength of a finished blade. For example, fiber tows may point in a first direction at a blade root area and curve to a second direction at a blade tip area. The direction of the fiber tows may be predetermined using computer modeling to identify orientations that strengthen the blade. The fiber tows may also be placed using AFP in un-crimped manner. Fiber tows 100 may also be placed using AFP on a separate tool and then attached to core 106.

In various embodiments, the various layers of internal fiber tows 102, external fiber tows 100, and/or core 106 may be laid on a support and needled or tufted together simultaneously or in a series of needling steps. Tufting and/or needling processes may interconnect the horizontal fibers in a third direction (also called the z-direction). The fibers extending into the third direction may be referred to as z-fibers. The needling process may involve driving a multitude of barbed needles into the fibrous layers to displace a portion of the horizontal fibers into the z-direction. Similarly, tufting may involve sewing tufting 104 into the various layers to retain the internal fiber tows 102, external fiber tows 100, and/or core 106 relative to one another. Tufting 104 may extend partially into core 106 and/or completely through core 106. Tufting may be done on both sides of the core 106. Resin material 107 may infiltrate the fiber tows and/or core in response to an RTM process.

Figure 6:
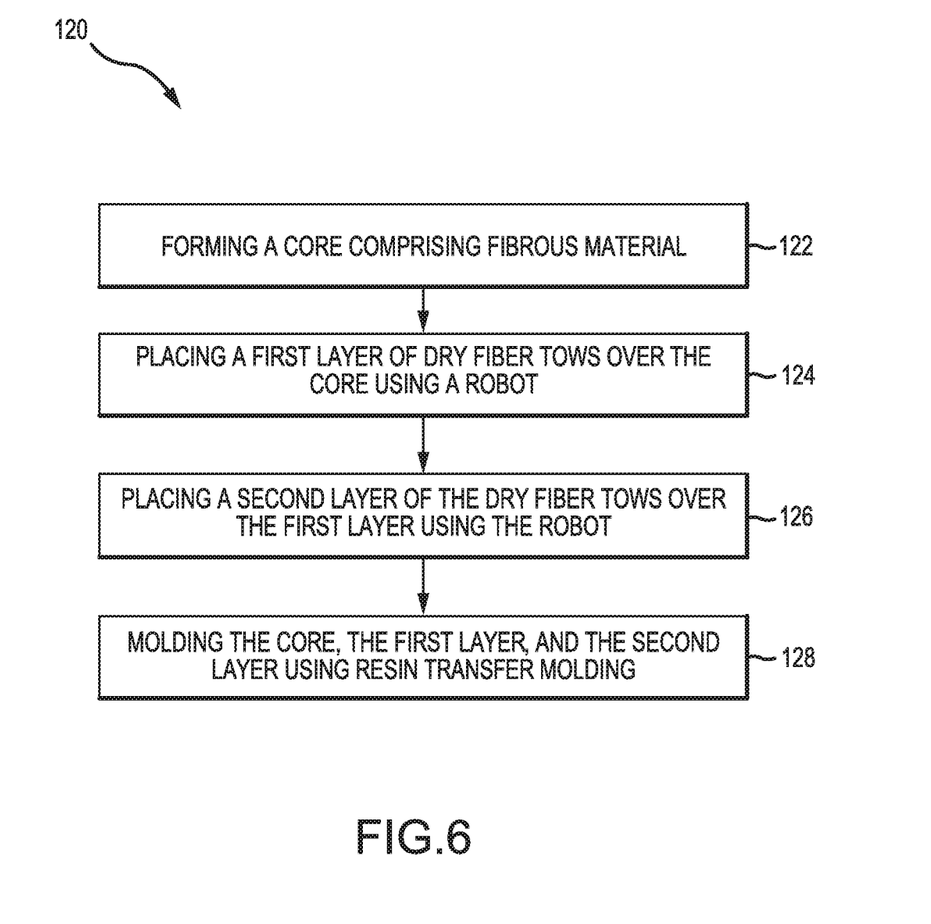
FIG. 6 illustrates a method of forming a blade using automated fiber placement of dry fiber tows, in accordance with various embodiments.

Referring now to FIG. 6, a method 120 for making a fan blade (e.g., blade 72 of FIG. 2) is shown, in accordance with various embodiments. A core is formed comprising fibrous material (Step 122). A first layer of dry fiber tows is placed over the core using a robot (Step 124). The first layer of the dry fiber tows may be substantially un-crimped. The first layer of the dry fiber tows may also include a thermoplastic coating. A second layer of the dry fiber tows may be placed over the first layer of the dry fiber tows using the robot (Step 126). The second layer may be similar to the first layer in characteristics. The core, the first layer of the dry fiber tow, and the second layer of the dry fiber tows may be molded using resin transfer molding (Step 128).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one killed in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a fan blade, comprising:
   forming a core comprising fibrous material;
   placing a first layer of dry fiber tows over the core using a robot, wherein the first layer of dry fiber tows is substantially un-crimped, wherein the first layer of dry fiber tows includes a thermoplastic coating;
   placing a second layer of dry fiber tows over the first layer of dry fiber tows, wherein the second layer of dry fiber tows is substantially un-crimped, wherein the second layer of dry fiber tows includes the thermoplastic coating; and
   molding the core, the first layer of dry fiber tows, and the second layer of dry fiber tows using resin transfer molding, wherein the thermoplastic coating is configured to increase the relative retention between each of the first layer of dry fiber tows and the second layer of dry fiber tows in response to heating.

2. The method of claim 1, further comprising trimming the core before the placing the first layer of dry fiber tows over the core.

3. The method of claim 1, wherein the first layer of dry fiber tows is placed over the core in a curved configuration.

4. The method of claim 1, wherein the core comprises a three-dimensionally woven core formed on a loom.

5. The method of claim 1, wherein the core comprises a plurality of layers of dry fiber tows placed by the robot.

6. The method of claim 1, further comprising heating the thermoplastic coating after the placing the first layer of dry fiber tows over the core.

7. The method of claim 1, further comprising tufting the first layer of dry fiber tows and the second layer of dry fiber tows to generate a z-fiber, wherein the z-fiber extends through the first layer, the second layer, and at least partially into the core.

8. The method of claim 1, further comprising needling the first layer of dry fiber tows and the second layer of dry fiber tows.

9. A fan blade, comprising:
a core comprising a fibrous material;
a plurality of first layers of dry fiber tows placed about the core to form a skin, wherein the plurality of first layers of dry fiber tows includes a thermoplastic coating, wherein the plurality of first layers of dry fiber tows are substantially un-crimped; and
a resin material injected into at least one of the core or the first plurality of layers of dry fiber tows,
wherein the thermoplastic coating is configured to increase the relative retention between each of the plurality of first layers fiber tows in response to heating.

10. The fan blade of claim 9, wherein the fibrous material of the core comprises a three-dimensionally woven material.

11. The fan blade of claim 9, wherein the fibrous material of the core comprises a plurality of second layers of dry fiber tows.

12. The fan blade of claim 9, wherein the plurality of layers of dry fiber tows are curved.

13. The fan blade of claim 9, further comprising a tufting disposed in each of the plurality of first layers of dry fiber tows comprising a z-fiber extending through the first layers and at least partially into the core.

14. The fan blade of claim 9, wherein the plurality of layers of dry fiber tows is needled together.

15. A fan for a gas turbine engine, comprising:
a hub;
a fan blade coupled to the hub and configured to rotate about the hub, the fan blade comprising:
a core comprising fibrous material;
a first layer of dry fiber tows placed over the core, wherein the first layer of dry fiber tows is substantially un-crimped, wherein the first layer of dry fiber tows includes a thermoplastic coating; and
a shroud disposed about the fan blade,
wherein the thermoplastic coating is configured to increase the relative retention between the first layer of dry fiber tows and a second layer of dry fiber tows in response to heating.

16. The fan of claim 15, wherein the first layer of dry fiber tows is curved relative to a surface of the fan blade.

17. The fan of claim 15, wherein the fan blade further comprises the second layer of dry fiber tows placed over the first layer of dry fiber tows.

18. The fan of claim 17, wherein the first layer of dry fiber tows and the second layer of dry fiber tows are tufted together.

19. The fan of claim 17, wherein the first layer of dry fiber tows and the second layer of dry fiber tows are needled together.

20. The fan of claim 15, wherein the fan blade further comprises a resin material injected into at least one of the core or the first layer of dry fiber tows.

* * * * *